Feb. 13, 1968 W. R. MORGAN, JR 3,368,313
FLOOR EXPANSION JOINT ASSEMBLIES
Filed April 29, 1966 2 Sheets-Sheet 2
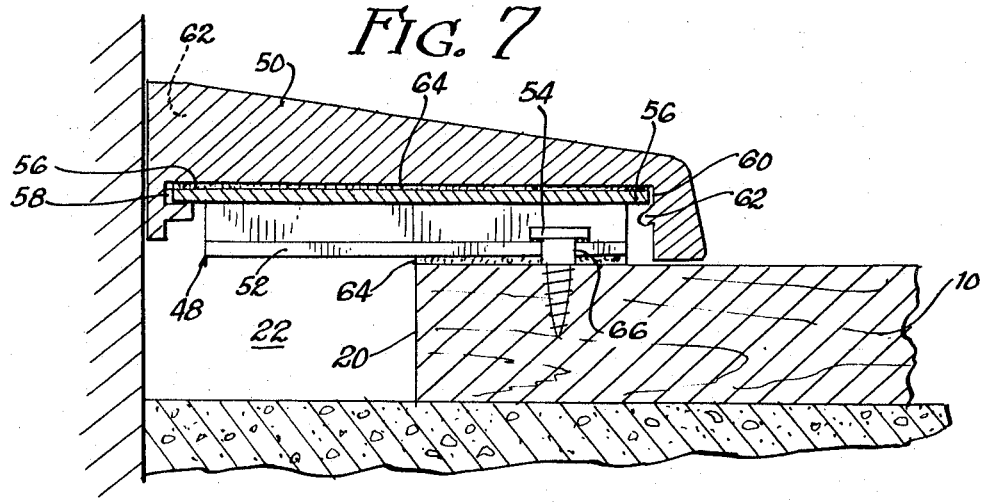
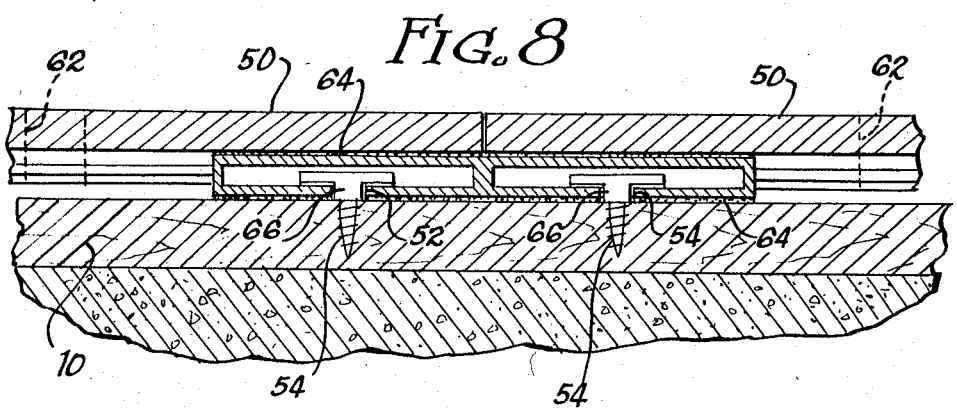
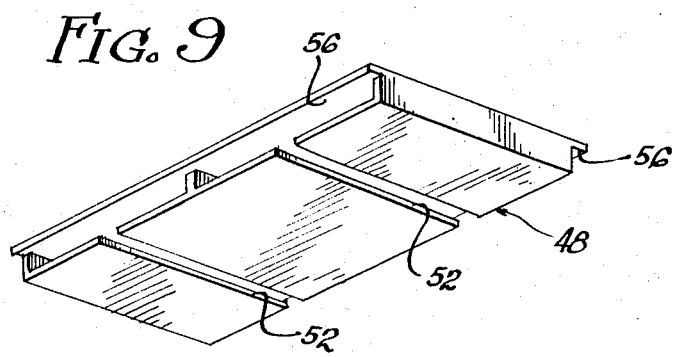
INVENTOR
William R. Morgan, Jr.
by McDougall, Hersh,
Scott and Ladd
Attys United States Patent Office 3,368,313
Patented Feb. 13, 1968

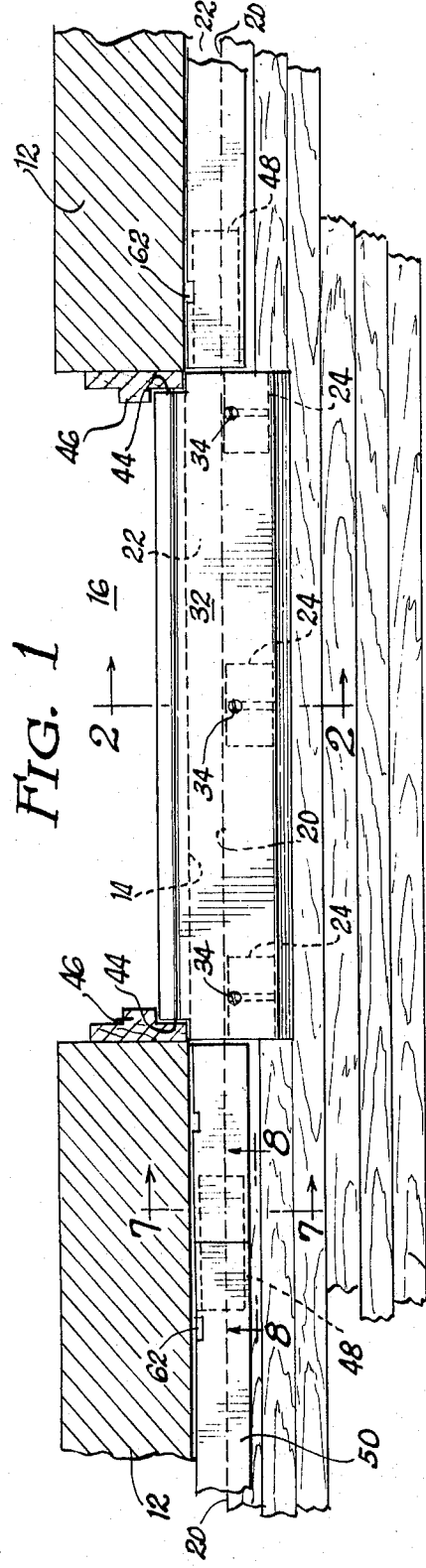
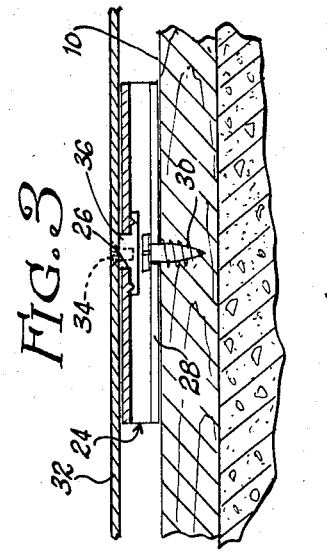
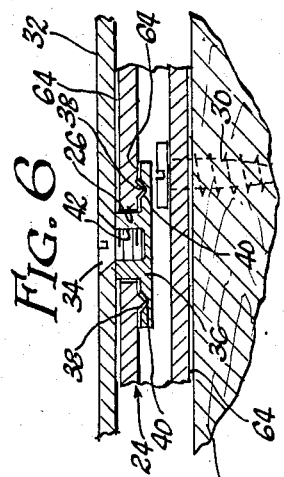
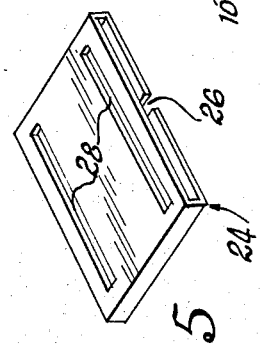
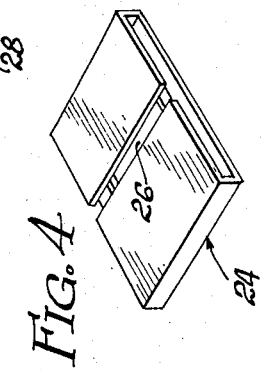

3,368,313
FLOOR EXPANSION JOINT ASSEMBLIES
William R. Morgan, Jr., R.R. 2, P.O. Box 106G,
Long Grove, Ill. 60047
Filed Apr. 29, 1966, Ser. No. 546,329
14 Claims. (Cl. 52—278)

FLOOR EXPANSION JOINT ASSEMBLIES

This invention relates to assemblies adapted to be employed in association with floors. The assemblies of this invention are designed for use in conjunction with floors susceptible to expansion after installation. A typical example of such floors comprises hardwood floors of the type used in the construction of gymnasiums, ballrooms, industrial plants, et cetera.

The instant invention will be described with reference to the installation of hardwood floors. It will be appreciated, however, that the problems referred to herein are also characteristic of other types of floors, and the assemblies referred to are not intended to exclude such other types of floors.

In the installation of hardwood floors, it is standard practice to provide expansion voids along the edges of the floors adjacent walls and in threshold areas. In the event that the floors expand with an increase in moisture content, for example, in response to changes in atmospheric conditions, the voids will permit movement whereby the floor edges will not press against stationary walls or the like. If this occurred, the floors would be caused to buckle or the wall structure could be damaged.

Expansion joint constructions have been designed for purposes of covering the voids provided around the edges of the wood floors. Such constructions usually comprise a flat area which extends outwardly from a wall or the like and which overlaps the edge of the floor. These constructions are anchored to the wall so that the expansion element will not itself restrict floor movement.

Devices of this conventional type are functionally satisfactory, but as a practical matter, they have many drawbacks. In the first place, it is necessary to secure these conventional elements to a concrete wall or to masonry, for example, a concrete block wall. Anchoring to such materials is a difficult task, and this results in a relatively high installation cost. Furthermore, such anchors are not reliable, and maintenance costs are, therefore, a problem.

The conventional expansion joint members lead to difficulties whenever a poor connection with a wall or other structural member results. A janitor, when discovering a loose anchor, will often take the simplest course and proceed to fasten the expansion joint to the wood floor. This completely defeats the purpose of the expansion joint since the movement of the floor is thereby restricted.

Conventional expansion joints are also considered objectionable from the standpoint of design since exposed fasteners are employed. This also increases the tendency for loosening of such fasteners. Designers and architects object to conventional expansion joint assemblies because they incorporate a substantial and unsightly vertical leg through which attachment is made to the wall.

It is a general object of this invention to provide improved expansion joint means for use in association with floors.

It is a more specific object of this invention to provide expansion joint means which are capable of accommodating expansion of floors in any direction and which are characterized by an economical and extremely reliable construction.

It is a still further object of this invention to provide expansion joint means of the type described which are secured directly to the floor in a relatively simple fashion whereby initial installation and maintenance costs are extremely low.

These and other objects of this invention will appear hereinafter and for purposes of illustration but not of limitation, specific embodiments of the invention are shown in the accompanying drawings in which:

FIGURE 1 is a plan view illustrating a floor section and adjacent areas with the expansion joint means of this invention located in position;

FIGURE 2 is an enlarged fragmentary cross-sectional view taken about the line 2—2 of FIGURE 1;

FIGURE 3 is a fragmentary cross-sectional view taken about the line 3—3 of FIGURE 2;

FIGURE 4 is a perspective illustration of a channel member employed in conjunction with the threshold expansion assembly of this invention;

FIGURE 5 is a perspective view of the channel member of FIGURE 4 is an inverted position;

FIGURE 6 is an enlarged fragmentary cross-sectional view taken about the line 6—6 of FIGURE 2;

FIGURE 7 is an enlarged fragmentary cross-sectional view taken about the line 7—7 of FIGURE 1;

FIGURE 8 is a cross-sectional view taken about the line 8—8 of FIGURE 1; and,

FIGURE 9 is a perspective view illustrating a channel member employed in conjunction with the base expansion assembly of this invention.

The specific improvements of this invention generally relate to expansion assemblies adapted to be located along a side edge of a floor. The assemblies permit free movement of the floor during expansion whereby buckling of the floor or damage to structures adjacent the floor can be avoided.

The assemblies of this invention comprise a base assembly as well as a threshold assembly. The base assembly is used to cover the gap which is provided between the edge of a floor and a vertical wall or other abutment which rises above the floor level. The threshold assembly is used primarily at doorways wherein a gap is left between a floor edge and the adjacent floor extending through the doorway. It will also be appreciated that the threshold assembly can be used where a gap is left between one section of floor and an adjacent section of floor.

Each of the assemblies described comprises a channel member having retaining means defined by a bottom wall. Means, such as a wood screw, cooperate with this retaining means for securing the channel member directly to the floor which is subject to expansion. The securing means and retaining means are assembled so that relative movement of the floor relative to the channel means is possible.

Additional retaining means are defined by the channel members for purposes of securing the channel members to a cover plate. The manner in which the cover plates are associated with the channel members permits relative movement therebetween in response to expansion of the floor. The respective retaining means of the channel members are designed whereby the possible movements accommodate expansion of the floor in any direction. Specifically, the retaining means can be designed whereby the movements permitted by the respective retaining means extend at right angles.

The accompanying drawings illustrate the application of the concepts of this invention to both base and threshold assemblies. FIGURE 1 illustrates a floor construction 10 which extends to a position adjacent vertical walls 12 and adjacent to the edge 14 of the floor which extends through the doorway 16. It will be noted that the side edge 20 of the floor 10 is spaced apart from the wall 12 and the floor edge 14 whereby a gap 22 is provided. This gap will accommodate expansion of the floor in response to changes in atmospheric conditions or due to other factors.

FIGURES 2 through 6 illustrate a design for a threshold assembly which incorporates the concepts of this invention. The assembly comprises a channel member 24 which includes an elongated opening 26 defined by its top wall and a pair of similar openings 28 defined by its bottom wall. Wood screws 30 are adapted to be inserted into the openings 28 whereby the channel member can be secured to the floor 10.

A cover plate 32 is attached to the channel member 24 by means of bolt 34. The bolt is passed through an appropriate hole in the cover plate and a nut 36 is attached thereto. The nut 36 is then inserted in the elongated opening 26. It will be noted that the nut 36 is rectangular in shape. This simplifies the assembly of the cover plate with the channel member since the nut and bolt can be loosely assembled with the cover plate, and the combination can then be set down on the channel member with the nut passing through the opening 26.

The channel member defines a pair of ridges 38 which extend along the opposite sides of the opening 26. Corresponding recesses 40 are formed in the nut 36 whereby the nut can be rotated after insertion and then seated in place. The bolt 34 can then be tightened whereby the nut will not slip out of the opening 26. Proper tightening of the nut and bolt can be accomplished by controlling the depth of the threaded bore 42 which receives the bolt 34. A workman can then simply tighten the bolt until it presses against the bottom of the bore.

It will be noted when considering FIGURE 1 that the channel members 24 are relatively short compared to the cover plate 32. Obviously, any desired number of such channel members could be utilized for properly securing the cover plate. The cover plate is otherwise held in place by fitting the corners 44 thereof in proper relationship with the door jamb 46. The cover plate does not have any rigid connection with the exception of this fitting relationship with the door jamb.

Upon expansion of the floor 10, the assembly will readily accommodate movement of the floor. Where the floor edge 20 tends to close the gap 22 as shown in FIGURE 2, the channel member 24 will move with the floor relative to the nut and bolt 34, 36. On the other hand, any longitudinal expansion of the floor will result in movement of the floor along with the wood screws 30 relative to the channel member 24. Obviously, the openings 28 permit this longitudinal expansion.

FIGURES 7 through 9 illustrate a base assembly which incorporates the concepts of this invention. This assembly includes a channel member 48 and a cover plate 50. The channel member defines slots 52 in its bottom wall, and these slots are adapted to carry wood screws 54 whereby the channel member can be attached to the floor 10. The channel members are relatively short compared with the length of the cover plate 50. As shown in FIGURE 1, the channel members 48 can be located at the junction of adjacent cover plates 50. Additional channel members can also be located intermediate the ends of the cover plates.

The cover plate 50 is retained by the channel member 48 by means of flanges 56 defined by the channel member. These flanges are received in grooves 58 and 60 which are formed in the cover plate. A nipple 62 forms the bottom edge of the recess 60 whereby one flange 56 can be inserted in the recess 58, and the cover plate can then be snapped into position by pressing the nipple 62 over the edge of the other flange 56.

Wood screws 54 are designed with a shoulder 66 to establish the exact depth of insertion of the screws. The screws are placed in wood floor 10 and then channel member 48 is mounted and held back from adjacent wall 12 to allow installation of cover plate 50. The channel member and cover plate assembly are then pushed tight to the wall. Appropriate openings can also be formed in the top surface of the channel member 56 to assist in securing the wood screws 54.

The cover plate 50 also defines vent openings 62 which extend adjacent the wall 12. These vent openings permit the circulation of air, and they also provide means for removing the cover plate for maintenance or other purposes. These vent openings also allow for under floor air circulation to reduce accumulation of moisture. Thus, a tool can be inserted into the vent openings, and the entire assembly can be pulled outwardly relative to the wood screws 54. The cover plate can then be snapped off.

In the operation of the base expansion joint, the floor and wood screws 54 will move relative to the channel member 48 whenever there is a tendency to close the gap 22 between the floor and the wall 12. When longitudinal expansion takes place, the channel member 48 is carried along with the floor relative to the cover plate 50. Thus, the flanges 56 move along in the recess 58 and 60.

It will be noted that the movements described with respect to both the threshold and base joints take place at right angles to each other. Obviously, if conditions caused a combination of such movements, for example in the case of localized expansion or where rooms of irregular shapes are involved, then the longitudinal and transverse movements would be combined to result in some net angular movement.

It will be appreciated that the forces which result during expansion of a floor are extremely high. Some material such as a friction gasket material can be inserted between the moving surfaces as shown at 64 in the various figures.

The constructions of this invention present many advantages when compared with conventional designs. The material costs are low, particularly in the case of base expansion design since there is no need to provide a vertical portion on the cover plate for securing the plate to the wall 12. The base assembly is also of a highly advantageous design since no exposed fasteners are employed. The elimination of the need for anchoring into masonry saves substantial installation and maintenance costs.

It will be understood that various changes and modifications may be made in the above described construction which provide the characteristics of this invention without departing from the spirit thereof particularly as defined in the following claims.

That which is claimed is:

1. In a floor construction, the improvement comprising an expansion assembly located along a side edge of the floor whereby the floor is free to move beneath the assembly during expansion, said assembly comprising a channel member, at least one elongated retaining means defined by the bottom wall of said channel member, means cooperating with said retaining means for securing said channel member to said floor, said securing means being movable with respect to said elongated retaining means in response to movement of said floor, a cover plate, at least one additional retaining means and means cooperating with said additional retaining means for securing said cover plate to said channel member, said channel being movable relative to said cover plate securing means in response to movement of said floor.

2. A construction in accordance with claim 1 wherein said retaining means extend at right angles to each other whereby said assembly accommodates movement in all directions.

3. A construction in accordance with claim 1 wherein said assembly is situated adjacent a wall with the cover plate spanning a gap between the edge of said floor and said wall.

4. A construction in accordance with claim 3 wherein the retaining means in the bottom wall of said channel member comprises an elongated slot, and wherein said additional retaining means comprises the combination of flanges formed at the edges of the top wall of said channel member and grooves formed in said cover plate receiving said flanges.

5. A construction in accordance with claim 4 wherein said elongated slot and said flanges extend at right angles to each other wherein said assembly accommodates movement in all directions.

6. A construction in accordance with claim 5 wherein a plurality of said cover plates extend along said wall and wherein a plurality of said channel members are located at spaced points along the length of said cover plates, at least some of said channel members being located at the junctures of said cover plates, a pair of said elongated slots being defined by said bottom wall to permit securing of said channel member on opposite sides of said juncture, and including screws inserted through each of said openings for securing said channel members to the floor.

7. A construction in accordance with claim 6 including vertical slots defined in said cover plate, said slots providing ventilation and serving as means for gripping said cover plate to permit removal thereof.

8. A construction in accordance with claim 1 wherein said assembly is situated whereby the cover plate spans a gap between an edge of said floor and an adjacent floor.

9. A construction in accordance with claim 8 wherein said assembly is situated at a threshold, said cover plate being fitted between door jambs at said threshold to provide means for holding the cover plate in position.

10. A construction in accordance with claim 9 wherein said retaining means comprise at least one elongated slot defined by the bottom wall of said channel member, and at least one additional elongated slot defined by the top wall of said channel member, said slots extending at right angles with respect to each other whereby said assembly is adapted to accommodate movement in all directions.

11. A construction in accordance with claim 10 wherein said cover comprises a substantially flat upper surface and turned down side edges, said side edges contacting said adjacent floors whereby said cover plate serves to block the passage of foreign materials beneath the cover plate.

12. A construction in accordance with claim 11 including a fastener extending through said cover plate and into the opening defined by the top wall of said cover plate, said fastener cooperating with guide elements formed in said top wall whereby said fastener retains said top plate and said channel member in association while permitting relative movement therebetween.

13. A construction in accordance with claim 12 wherein a pair of elongated slots are formed in parallel relationship in the bottom wall of said channel member and includes screws extending through said openings in said bottom wall for holding said channel member in association with said floor while permitting relative movement therebetween.

14. A construction in accordance with claim 13 wherein said channel members are relatively short in comparison with the length of said cover plate, and wherein said channel members are located at spaced positions along the length of said cover plate.

References Cited

UNITED STATES PATENTS

| | | | |
|---|---|---|---|
| 2,948,994 | 8/1960 | Thom | 52—278 |
| 3,170,268 | 2/1965 | Balzer et al. | 52—573 XR |
| 3,183,626 | 5/1965 | Schmitt | 52—278 XR |
| 3,270,474 | 9/1966 | Driggers | 52—278 XR |
| 3,331,171 | 7/1967 | Hallock | 52—573 |

FRANK L. ABBOTT, *Primary Examiner.*

PRICE C. FAW, *Assistant Examiner.*